G. BINDER.
INDICATOR FOR AUTOMATICALLY CONTROLLING CLOTHES WASHING AND DRYING.
APPLICATION FILED MAR. 29, 1917.
1,260,862.
Patented Mar. 26, 1918.
2 SHEETS—SHEET 1.
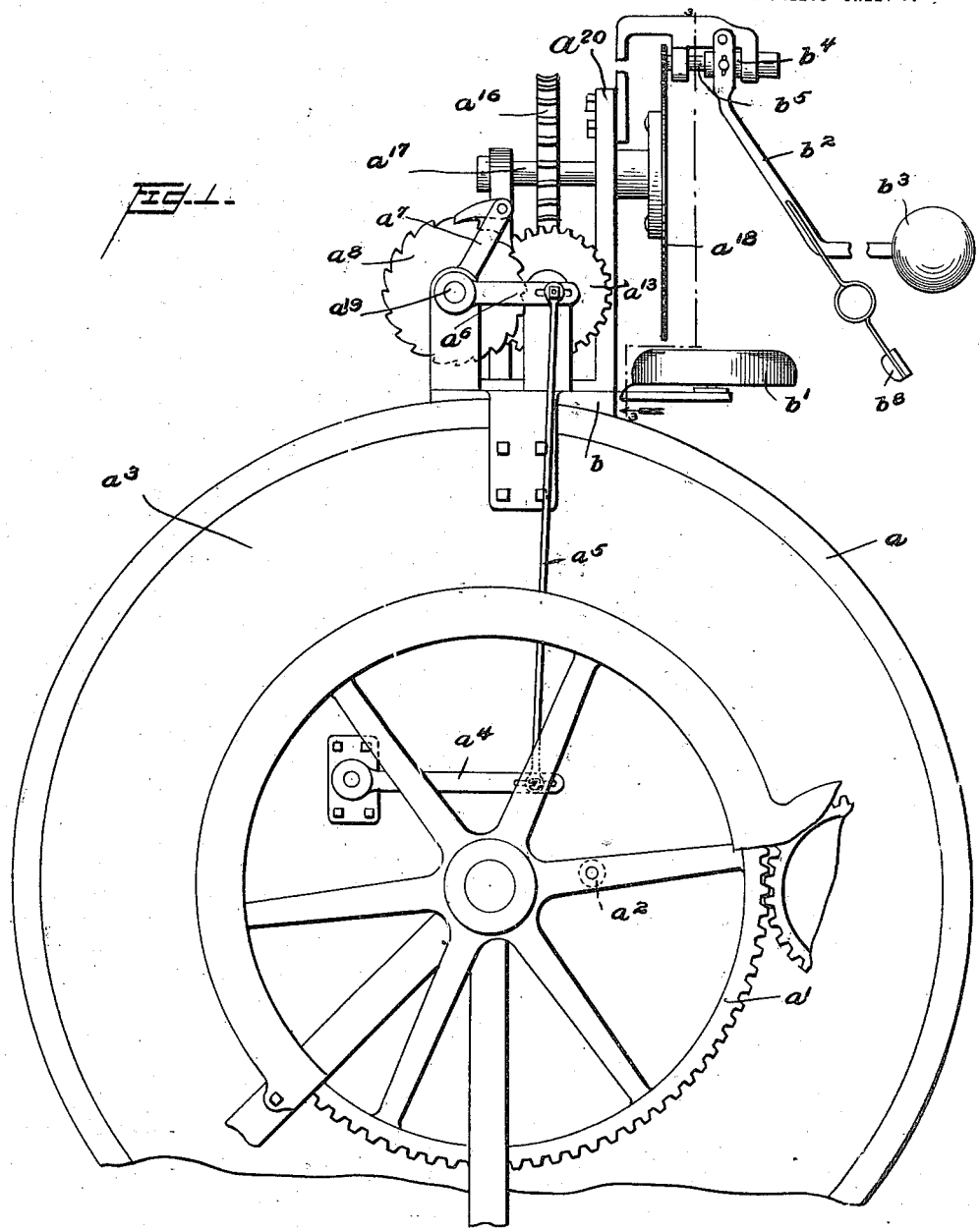

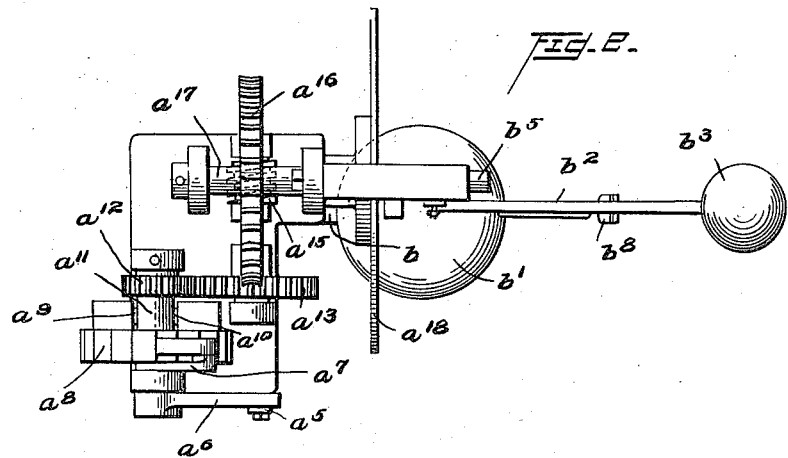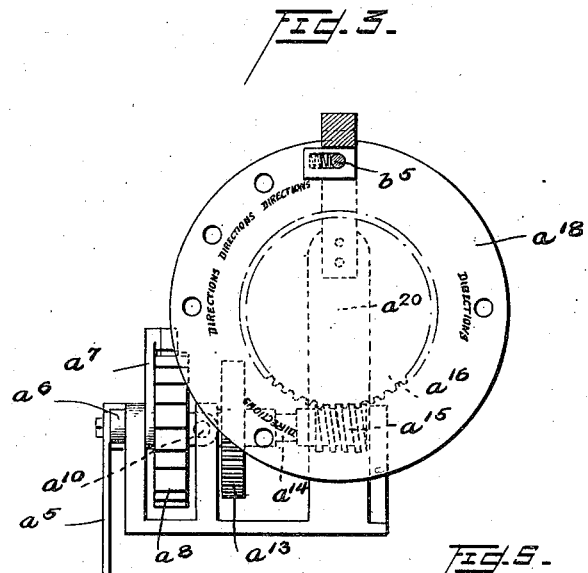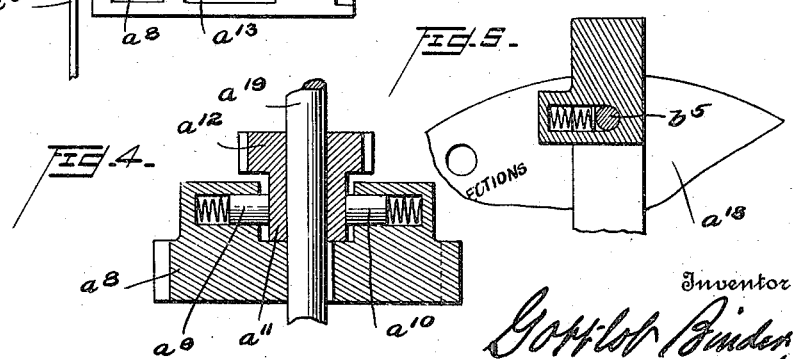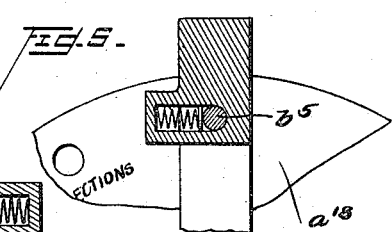

UNITED STATES PATENT OFFICE.

GOTTLOB BINDER, OF PHILADELPHIA, PENNSYLVANIA.

INDICATOR FOR AUTOMATICALLY CONTROLLING CLOTHES WASHING AND DRYING.

1,260,862.      Specification of Letters Patent.      Patented Mar. 26, 1918.

Application filed March 29, 1917. Serial No. 158,305.

*To all whom it may concern:*

Be it known that I, GOTTLOB BINDER, a citizen of the United States, residing at the city of Philadelphia, in the county of Philadelphia and State of Pennsylvania, have invented certain new and useful Improvements in Indicators for Automatically Controlling Clothes Washing and Drying, of which the following is a specification.

My invention has relation to an indicating appliance for attachment to a washing or drying machine to automatically control timed process operations of clothes washing and drying.

In the application of my invention to a clothes washing machine, as is well known, a series of operations are required of varying periods of time, as well as changes of water and temperatures and also mixtures of different substances or materials, such as soap, bleach, blue etc.

My invention is designed to automatically control each of the different timed operations, by a visible sounder or signal entirely governed or controlled by the location of perforations in an indicator disk so that at the end of each process operation, the operator is thereby notified to change from one process operation to another, the predetermined time movements of each different process operation being thus automatically indicated, without previous setting of the indicator-disk for the carrying out of the same; the effect being to eliminate error or oversight on the part of the operator handling the machines.

The aforesaid indicator-disk is so provided also with specific directions for each separate period of the several process operations designed to be carried out in the washing or drying machine as to enable the operator at a glance to determine therefore at any time just what different timed operations are yet to be performed in order to complete the entire series of operations.

The nature, scope and characteristic features of my invention will be more fully understood from the following description taken in connection with the accompanying drawings forming part hereof, in which—

Figure 1, is an end elevational view of a continuously rotating washer or drying cylinder, having an indicator appliance embodying the main features of my invention applied thereto.

Fig. 2, is a top or plan view of the said indicator-disk and signaling means.

Fig. 3, is a vertical sectional view on the line 3, 3, of Fig. 1.

Fig. 4, is a fragmentary sectional view of gear and ratchet mechanism and a friction-clutch which drives a perforated indicator disk of the indicator appliance of my said invention.

Fig. 5, is a broken sectional view of the spring controlled lock-bolt for the indicator disk, arranged for reliable positive action thereof.

Referring to the drawings $a$, represents a continuously operating washing or drying machine provided with a positively actuated power operated gear-wheel $a^1$, at one end of the machine, as clearly shown in Fig. 1. This gear-wheel is provided with a roller $a^2$, secured to one of the spokes of the same. To the end casing $a^3$, of the continuous operating washing or drying machine is pivoted a slotted arm $a^4$, to which is adjustably mounted a vertical rod $a^5$, connected with the slotted member $a^6$, of a bell-crank pawl-lever $a^7$, arranged to engage a ratchet $a^8$, mounted on a cross-shaft $a^{19}$. The said ratchet on one side is provided with spring positioned buffers $a^9$ and $a^{10}$, normally in bearing contact with a sleeve $a^{11}$, of the gear wheel $a^{12}$, loosely mounted on the shaft $a^{19}$. This gear-wheel $a^{12}$, gears with a complemental gear $a^{13}$, mounted on a cross-shaft $a^{14}$, also carrying a worm $a^{15}$, which latter meshes with a worm-gear $a^{16}$, mounted on the shaft $a^{17}$. This shaft carries the perforated indicator disk $a^{18}$, arranged on the face with directions for different process operations, which have not been shown.

To the base $b$ of a bracket or hanger $a^{20}$, is supported a signal device or bell $b^1$, and from the upper forked end a sleeve $b^4$, is slidably mounted on a lock-bolt $b^5$, which is in pivotal connection with an arm $b^2$, carrying a semaphore or ball $b^3$, and a clapper $b^8$; the latter for sounding the bell $b^1$. The lock-bolt $b^5$, is spring positioned as clearly shown in Fig. 5, so as to positively engage in a perforation of the disk $a^{18}$, at predetermined intervals of time, to lock the said disk, and to permit the semaphore to drop and at the same time the clapper to sound the bell $b^1$, to thereby signal to the operator that a certain process operation in the workings of the machine has been reached and as a notification to change to another operation. When ready to proceed with the next operation all that is necessary is to raise the semaphore $b^3$, which will withdraw the lock-bolt $b^5$, from one of the perforations of said disk $a^{18}$. It will be understood that while the lock-bolt $b^5$, is engaged in a perforation of the disk $a^{18}$, because of the friction clutch the gear $a^{12}$, will stand still and the ratchet $a^8$, will continue to revolve along with the washing or drying machine. The peripheral perforations in the disk $a^{18}$, it will be understood correspond to the different process operations to be carried out and these perforations are spaced apart so as to accurately correspond with the length of time or the different periods of the series of such process operations. When the said disk is revolved so that a perforation thereof comes opposite the said bolt, the latter enters and in entering causes the clapper to be actuated to strike the bell $b^1$, by the ball or semaphore dropping in a downward direction. The face of the disk $a^{18}$, is provided with different required directions or instructions as a guide to the operator, not shown, in respect to the series of process operations to be carried out in the washing, etc. After making the said change the operator can attend to other work, until a signal has again sounded or notice has been visibly given to the operator to ascertain what particular process operation has been completed and thus when to proceed with the next operation in the series of such process operations, but whether the operator gives immediate attention thereto or not, it matters not, because until the lock-bolt $b^5$, is manually withdrawn from a hole of the disk $a^{18}$, in which it is engaged, the following process operations will not take place. It will, however, be understood, that any lack of prompt attention on the part of the operator will not in any way affect the time durations of the subsequent process operations to be carried out in the continuous operating washing or drying machine.

In order to provide that the disk $a^{18}$, may make one revolution in the time required for a certain complete process operation the gears $a^{12}$ and $a^{13}$, may be arranged similar to gears on a lathe or milling machine to derive different feed speeds and likewise the ratchet $a^8$, may be provided with a lesser or greater number of teeth.

Having thus described the nature and objects of my invention what I claim as new and desire to secure by Letters Patent is:—

1. A device of the character described, comprising an indicator-disk having different timing perforations, means for actuating said disk, said actuating means including a hanger carrying a signaling device, a lock-bolt arranged to positively at predetermined intervals engage perforations of said disk, a shaft carrying a gear and a sleeve having spring controlled buffers arranged to contact therewith to coincidently with the giving of a signal permit the gear of said actuating means to continue to revolve, while said disk is in locked condition.

2. A device of the character described, comprising an indicator-disk having different timing perforations, means for actuating said disk, said actuating means including a hanger carrying a signaling device, a lock-bolt arranged to positively at predetermined intervals engage perforations of said disk, a cross-shaft carrying a gear, a sleeve and spring controlled buffers arranged to contact with said sleeve to coincidently with the giving of a signal permit the gear of said actuating means to continue to revolve, while said disk is in locked condition.

In witness whereof, I have hereunto set my signature in the presence of the two subscribing witnesses.

GOTTLOB BINDER.

Witnesses:
J. WALTER DOUGLASS,
MARIAN GROOM.

Copies of this patent may be obtained for five cents each, by addressing the "Commissioner of Patents, Washington, D. C."